United States Patent [19]
Kerber et al.

[11] 3,975,889
[45] Aug. 24, 1976

[54] HARVESTING COMBINE AND SEPARATE QUICK ATTACH CROP PICKUP COMPONENTS THEREFOR

[75] Inventors: Dathan R. Kerber, Bettendorf, Iowa; Richard E. Benson, East Moline; John L. VandeWiele, Moline, both of Ill.

[73] Assignee: International Harvester Company, Chicago, Ill.

[22] Filed: Feb. 13, 1975

[21] Appl. No.: 549,583

[52] U.S. Cl. ........................ 56/2; 56/14.4; 56/15.6
[51] Int. Cl.² ................................ A01D 47/00
[58] Field of Search .......... 56/208, 15.8, 2, DIG. 1, 56/DIG. 9, 364, 14.3–14.5, 15.6

[56] References Cited
UNITED STATES PATENTS

| | | |
|---|---|---|
| 3,324,635 | 6/1967 | Ashton et al. .......................... 56/2 |
| 3,488,930 | 1/1970 | Gorsler et al. .......................... 56/2 |

*Primary Examiner*—J.N. Eskovitz
*Attorney, Agent, or Firm*—F. David AuBuchon; Floyd B. Harman

[57] ABSTRACT

A harvesting combine header or platform having facilities whereby, by a quick attach and release operation, several crop pickup components may be operatively applied thereto. Anchor devices on the platform cooperate with special divider components on the reel assembly and with fast pins to releasably hold the reel assembly in place. Withdrawal of the fast pins frees the reel assembly from the platform. Similarly, bolting facilities are provided on the bottom and back wall of the platform and provide anchor points for a windrow pickup assembly. Unfastening of these bolting facilities frees the windrow pickup from the platform.

8 Claims, 5 Drawing Figures

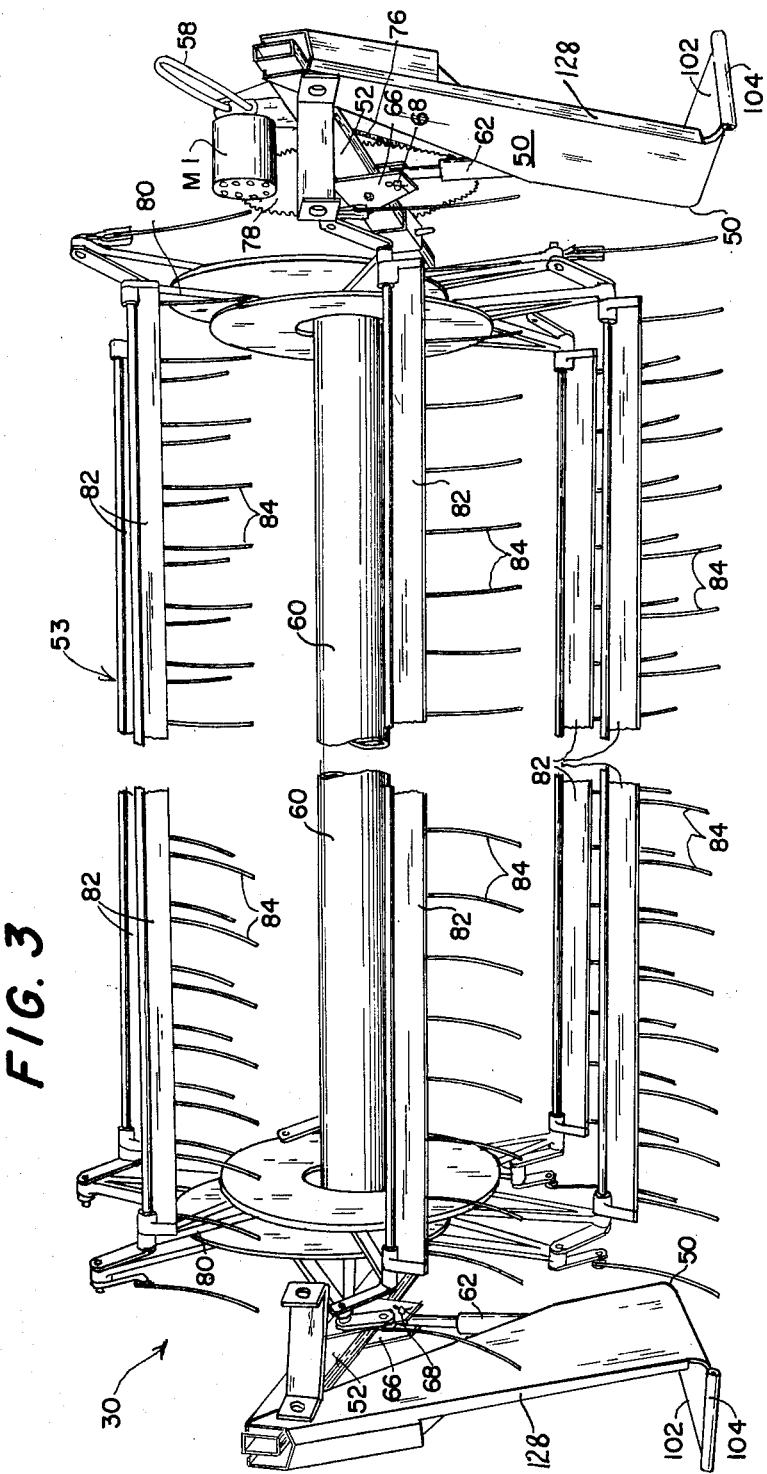

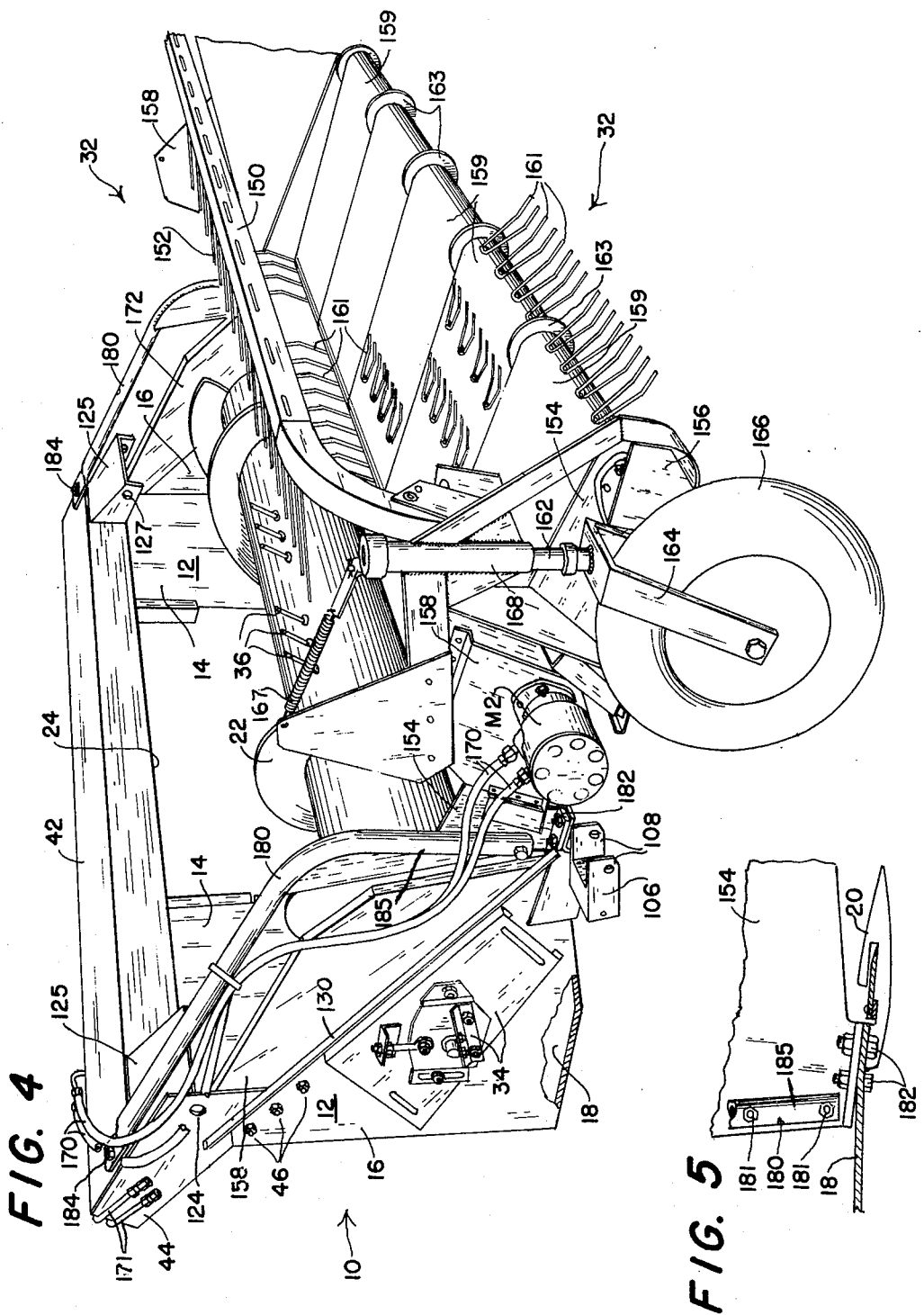

HARVESTING COMBINE AND SEPARATE QUICK ATTACH CROP PICKUP COMPONENTS THEREFOR

The present invention relates to a harvesting combine header or platform and has particular reference to a novel combination of combine header casing with certain structural frame elements associated with both a reel assembly and a windrow pickup assembly whereby either assembly may be operatively substituted for the other and the header or platform thus converted from one type of crop pickup operation to another.

Heretofore, in the field, a changeover from reel operation to windrow pickup operation has necessitated a tedious process of stripping many of the reel components from the platform in piecemeal fashion and then assembling the windrow pickup in its place on the platform in a similar piecemeal fashion. This requires a large amount of work as well as the fitting of parts in place with subsequent adjustment thereof. The same is true when converting the platform from windrow pickup operation to reel operation. Frequently this work cannot be performed in the field and the platform must be returned to the shop to effect the necessary conversion.

The present invention is designed to overcome the above-noted limitations that are attendant upon the effecting of conversion of this type and, toward this end, the invention comtemplates the provision of a novel combine platform which, except for a few minor modifications which are made to the casing thereof, is largely conventional in its design and construction, together with a generally conventional reel having novel divider components that are provided with facilities that enable the reel to be operatively applied bodily as a unit to the platform and removably fastened in place. Specifically, the fastening facilities for the reel consist of a few fast bolts which may be readily applied or withdrawn without the use of special tools and which, when so withdrawn, completely release the reel from the platform and leave the same in a standing condition. Similarly, the fastening facilities for the windrow pickup consist of a few bolt assemblies which likewise require no special tools and when such bolt assemblies are unfastened, the windrow pickup is completely released from the platform and likewise left in a standing condition. In either event, backward movement of the combine, and consequently of the platform, will serve to completely separate the platform casing from the crop pickup unit, whether the latter be a reel or a windrow pickup.

The provision of a combine platform in selective association with a real assembly and a windrow pickup assembly in the manner briefly outlined above, and possessing the stated advantages, constitutes the principal object of the present invention. A further advantage of the invention resides in the provision of platform and crop pickup assemblies which, when pickup assembly substitution is effected, requires no modification of the functional components such as the platform crop-cutting knife, the platform auger, the reel proper, the windrow belt or apron, or, in fact, any of the operating components associated therewith, such components remaining intact and continuing to function in their usual manner of operation. Stated otherwise, the functional components of both the reel and the windrow pickup remain in their cooperating relationship at such time as these devices are removed from the platform, and they resume their operation without attention of any sort, as soon as the desired substitution has been effected.

With these and other objects in view, which will become readily apparent as the nature of the invention is better understood, the invention consists of the novel construction, combination and arrangement of parts shown in the accompanying three sheets of drawings forming a part of this specification.

In these drawings:

FIG. 3 is a rear perspective view of the completely removed reel assembly;

FIG. 4 is a fragmentary front right hand perspective view of the harvesting combine header or platform of FIG. 1 showing the reel assembly removed and a windrow pickup unit substituted therefor and operatively applied thereto; and FIG. 5 is an enlarged view showing the bottom connection of the windrow pickup to the platform.

Figure 1:
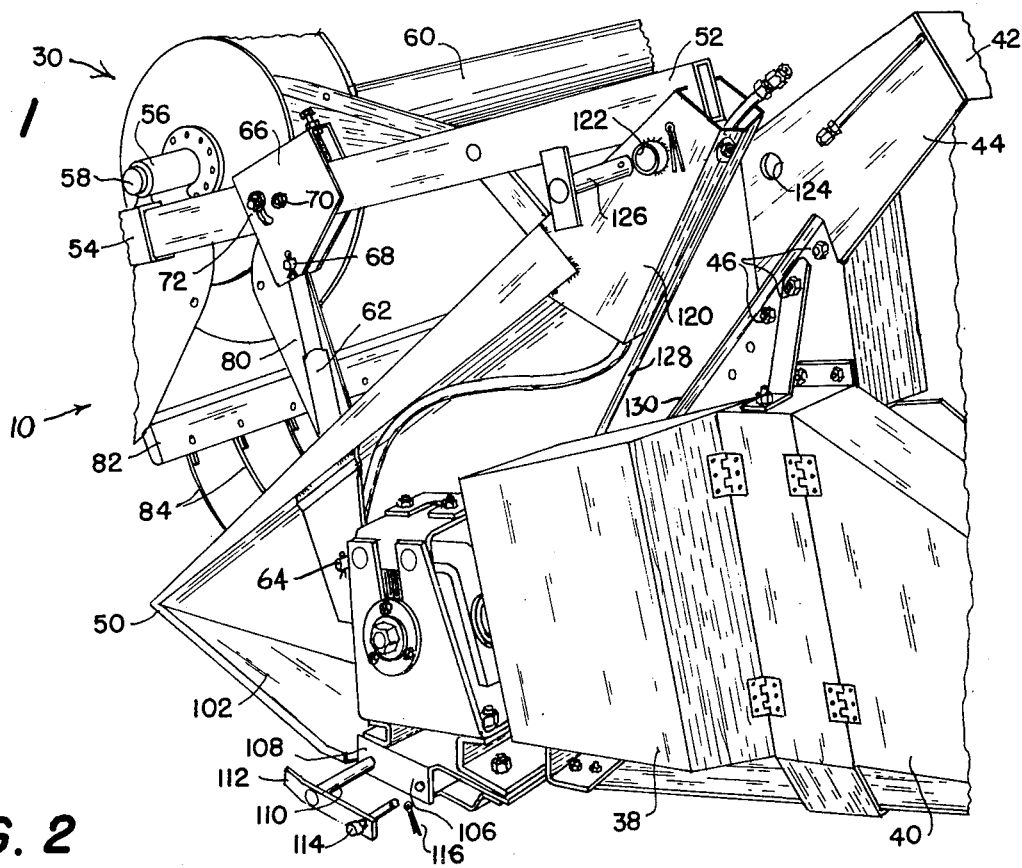
FIG. 1 is a fragmentary perspective view of the rear left side of a harvesting combine header or platform showing a reel assembly including the reel proper, the reel lift mechanism, reel support parts and divider components, in uncoupled relationship relative to the platform and preparatory to operative attachment to the latter.
Figure 2:
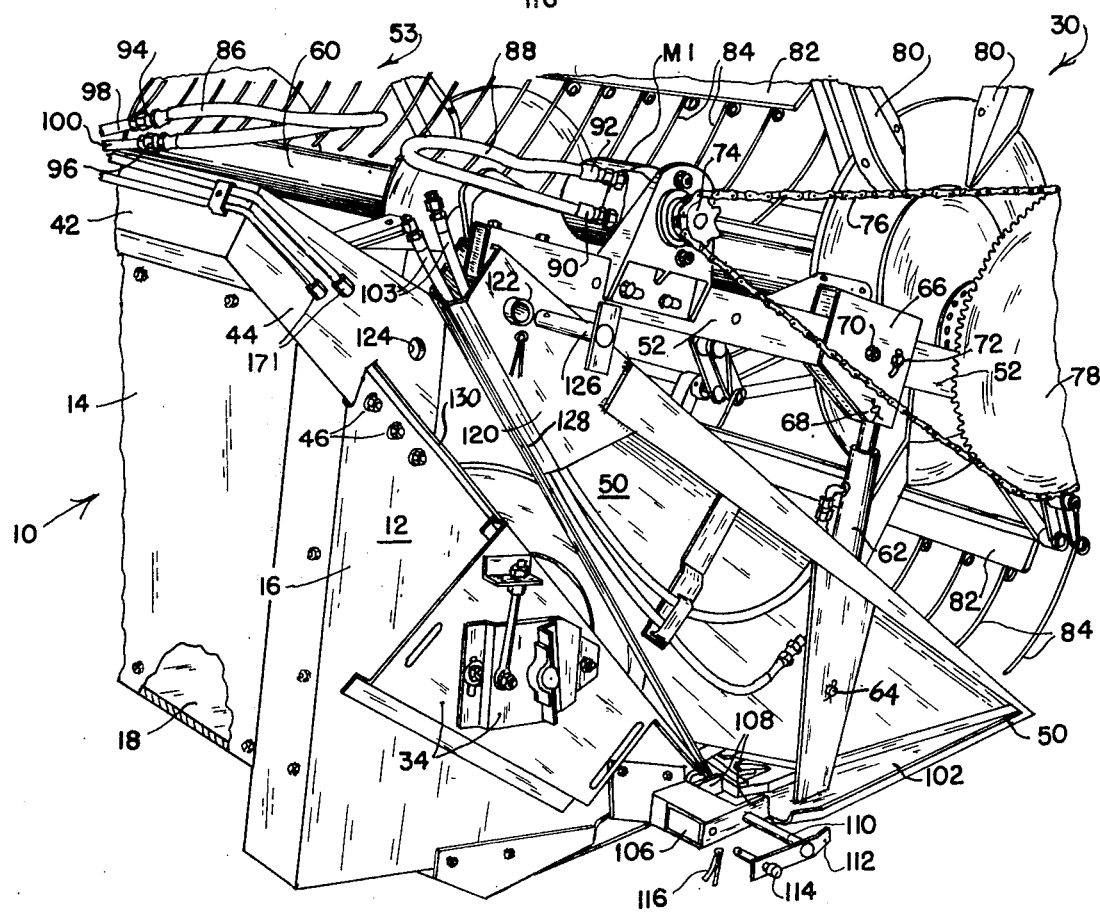
FIG. 2 is a fragmentary perspective view, similar to FIG. 1, of the rear right side of the platform with the reel assembly in uncoupled relationship.

Referring now to the drawings in detail and in particular to FIGS. 1, 2 and 4, a harvesting combine platform or header is designated in its entirety by the reference numeral 10 and it embodies a casing 12 which appears in its entirety only in FIG. 4, the casing having a rear wall 14, side walls or sheets 16 and a bottom wall 18 along the forward transverse edge of which there is disposed the usual sickle-type crop-severing knife assembly 20 (FIG. 5). Disposed within the platform casing 12 is the usual auger 22 (FIG. 4) having right and left hand flights for feeding the crop toward the central region of the platform for discharge rearwardly through an opening 24 which is provided in the rear wall 14. It will be understood that the opening 24 communicates with the infeed end of a conventional combine feeder (not shown) which is connected to such rear wall and by means of which the crop is elevated and passed to the threshing and separating instrumentalities associated with the combine.

According to the present invention, the platform casing is equipped with facilities, which enables the platform to be converted from one type of operation to another and specifically from use in the direct cutting of crops to use for windrow pickup operation. This invention also enables the platform to be easily converted from a fixed to a floating cutter bar type pickup. To effect these conversion, special divider components employed in connection with an otherwise conventional reel assembly such as that which is disclosed in FIG. 3 and designated in its entirety at 30 and certain other adjuncts are associated with an otherwise conventional windrow pickup assembly such as that which is disclosed in FIG. 4 and designated in its entirety at 32, such modifications of the reel and windrow pickup having counterparts which are provided on the platform casing whereby either the reel or the windrow pickup may be substituted, each for the other, to effect a quick conversion from one type of operation to the other. Such substitution may be made without disturbing the position and functioning of the platform auger 22 and its associated control instrumentalities, or the position of the crop severing knife assembly 20 which is merely disabled when window pickup operation is prevalent.

Further platform adjuncts which have been illustrated herein but which constitute no part of the present invention are an adjusting mechanism 34 (FIGS. 2 and 4) on the right side of the platform and by means of which the position of the auger 22 may be adjusted, and also by means of which the in and out motion of the usual rectractible auger fingers 36 may be varied, and a series of hinged gear guards or shields 38 and 40 (FIG. 1) on the left side of the platform. A tubular beam 42 (FIGS. 1, 2 and 4) which is rectangular in cross section extends transversely across the platform 10 along the upper edge of the rear wall 12 and each end of the beam has welded thereto a trapezoidal shaped attachment plate 44, the function of which will be set forth presently. The attachment plates are bolted as indicated at 46 to the side walls 14 of the platform casing 12.

As previously stated, the platform casing is adapted for selective reception of either the reel assembly 30 of FIGS. 1, 2 and 3, or the windrow pickup assembly 32 of FIG. 4. Considering first the nature of the reel assembly 30, although such assembly has been illustrated in FIGS. 1 to 3 inclusive in considerable detail, only a brief description thereof will be set forth herein inasmuch as such assembly is to a large extent and, except for certain divider components which are associated therewith, of conventional design.

Briefly, the reel assembly 30 involves in its general organization left and right hand divider components 50 to the upper ends of which there are pivoted the proximate ends of a pair of forwardly extending tubular reel support arms 52, the outer ends of which serve to support therebetween a reel proper 53. Each end of the reel 53 is adjustably supported from the outer or distal end region of its associated support arm 52 by means of a longitudinally adjustable bearing supporting sleeve or bracket 54 (FIG. 1) which carries a bearing 56 for the adjacent end of the transverse reel shaft 58 which projects through the tubular reel axle 60.

Vertical reel movements are effected under the control of the usual hydraulic lift cylinder 62 which is pivoted at its lower end as indicated at 64 (FIGS. 1 and 2) to the adjacent divider 50, there being one such lift cylinder for each end of the reel. Fine adjustments of each end of the reel may be accomplished under the control of an adjusting bracket 66 which is pivoted at 68 to the upper end of the extensible and contractible lift cylinder 62 and is also pivoted at 70 to the adjacent support arm 52. A pin and arcuate slot connection 72 allows for angular turning movement of the bracket 66 and ultimate clamping of such bracket in any selected position of adjustment. A drive sprocket 74 associated with a hydraulic motor M1 is connected by means of an endless chain 76 to a driven sprocket 78 on the right hand end of the reel axle for effecting rotation of the reel 53.

The reel proper 53 is in the form of a cage-like structure and, in addition to the transverse reel axle, embodies a series of spider-like end members including generally radially extending arms 80 across which there extend peripheral transverse bats 82, the function of which is to urge the cut crop rearwardly and into the platform. Only one such bat is disclosed in FIG. 1 while two such bats are shown in FIG. 2. The usual pickup fingers or reel tines 84 are associated with each bat 82.

Flexible fluid lines 86 and 88 extend to the motor M1. Normally the line 86 is connected between a pair of fittings 92 and 94 while the line 88 is connected between a pair of fittings 90 and 96. The fittings 90 and 92 are provided on the motor M1 while the fittings 94 and 96 are associated with fluid supply and return lines 98 and 100. When the pickup reel assembly 30 is disconnected from the platform 10, the line 86 may be connected between the fittings 94 and 96 while the line 88 may be connected between the fittings 90 and 92 so that there will be no escape of fluid from the system.

The above described reel assembly components constitute the essential or principal components which are necessary to effect the desired reel pickup action. Numerous other reel adjuncts and components of a minor nature and which bear no relation to the present invention are disclosed herein but a description thereof would serve no useful purpose.

Considering now the manner in which the reel assembly 30 is operatively applied to and removed from the platform or header 10, and referring particularly to FIG. 3, each divider 50 is formed with a laterally and outwardly turned foot-like region 102 to the rear end of which there is welded a length of tube stock 104 which establishes an attachment member which is designed for cooperation with an attachment bracket 106 which is welded to the forward lower corner of the adjacent side wall 16 of the platform casing 12. Each attachment bracket 106 is of tubular rectangular design and is provided with a pair of forwardly extending flanges 108 which are spaced apart a distance substantially equal to the length of the aforementioned tubular attachment member 106. This latter attachment member is adapted to be received between the two forwardly extending flanges 108 of the member 106 and in order to releasably retain the tubular member 104 in position, a fast pin 110 having a fastening strip 112 welded thereto is adapted to be projected through a pair of aligned holes which are formed in the two flanges 108, as well as through the tubular attachment member 104 while a locking pin 114 projects through the fastening strip 112 and also through a hole which is provided in the outer sidewall of the bracket 106. A cotter pin 116 is inserted in a hole formed in locking pin 114 through the open rear end of bracket 106 and functions to hold strip 112 and consequently the fast pin 110 in position. With the fast pin 110 thus in place, the lower end portion of the divider component 50 is securely anchored to the adjacent side wall 16 of the platform casing 12.

In order to secure the upper end portion of the divider 50 to the upper region of the adjacent side wall 16, the divider 50 is formed with an upturned reentrant outside flange 120 and an attachment sleeve or tube 122 projects through such flange to register with a hole 124 provided in the aforementioned trapezoidal plate 44. A fast pin 126 passes through the tube 122 and hole 124 and serves to anchor the upper end of the divider component 50 to the platform casing 12. As can be best seen in FIG. 4 an inverted U-shaped support 125 is secured to the inside surface of each attachment plate 44. The flanges of support 125 have holes 127 formed therein. Holes 127 are aligned with the holes 124 formed in attachment plate 44. The fast pin 126 projects through tube 122, hole 124 and hole 127 and is secured in place by a cotter pin.

It is to be noted at this point that when both divider components 50 are thus secured in position by their respective fast pins 110 and 126, the upwardly and rearwardly inclined rear edges 128 of the divider components (FIGS. 1 and 2) will seat upon the upwardly and rearwardly inclined forward edges 130 of the platform side walls 16 thus establishing, in effect, composite right and left hand divider assemblies.

Considering now the windrow pickup assembly 32 and referring to FIG. 4, wherein such assembly is illustrated as being operatively installed with the platform casing 12, the assembly is largely conventional in its construction, at least as far as its operative components are concerned and therefore such components will be referred to herein only briefly.

The windrow pickup assembly is entirely self-contained and it involves in its general organization a transverse frame bar or grain deflector 150 having hold down fingers 152 projecting rearwardly therefrom. Side plates 154 on opposite sides of the assembly serve to support various structural components, the left hand plate as viewed in FIG. 4 supporting a chain guard and mounting plate 158.

Pickup means in the form of a series of belts 159 carrying the usual pivoted pickup fingers or tines 161 are trained about front and rear rollers (not shown). The rear rollers are driven by a motor M2 on the left hand side of the assembly, such motor having hydraulic fluid line connections 170 which are detachable from supply lines 98 and 100 carried by the platform casing 12.

Supported at the front portion and on opposite sides of the side plates 154 are caster-type wheels 166 having caster forks 164 and spindles 162 which project through socket members 168 and are biased by springs 167 so as to normally maintain a fore and aft caster wheel direction.

The windrow pickup assembly 32 is connected to the casing 12 by transversely spaced side supports in the form of tubular rails 180, the upper ends of which are removably secured by bolts 184 to the aforementioned tubular beam 42, and vertical portions 185 (see also FIG. 5) of which are secured by bolts 181 to side plates 154. These latter side plates are removably fastened by bolts 182 to the forward edge region of the bottom wall 18 of the platform casing 12. It is to be noted at this point that the bolts 184 which secure the upper rear ends of the rails 180 to the tubular beam 42 of the platform casing 12 and the bolts 182 which secure the side plates 154 to the bottom wall 18 of the casing 12 constitute the sole means whereby the windrow pickup assembly 32 is secured in position within the platform 10. When it is desired to remove the pickup assembly from the platform for pickup reel substitution, or for any other reason whatsoever, it is merely necessary to unfasten and remove such bolts, thus freeing the windrow pickup assembly 32 from the platform 10. Thereafter, by backing the combine and its associated feeder and platform, the windrow pickup assembly will be left in a standing condition.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In an agricultural implement, the combination with a harvester platform having a casing provided with a generally horizontal bottom wall having a forward edge, a pair of laterally spaced upstanding side walls presenting upwardly and rearwardly inclined forward edges, and a vertical rear wall provided with a crop infeed opening adapted for communication with a combine feeder;

a reel assembly operatively and removably secured to said platform casing, said assembly having a pair of divider components which are substantially coplanar with the platform side walls and having upwardly and rearwardly inclined rear edges which seat upon said inclined forward edges of said side walls whereby said side walls and divider components establish, in effect, composite divider members at the opposite sides of the platform, an elongated reel supported at opposite ends on said pair of divider components, cooperating first releasable means at the upper rear corner regions of the side walls and divider components for securing such regions together, and cooperating second releasable means at the lower forward corner regions of said side walls and rear lower corner regions of the divider components for securing such latter regions together, said first and second releasable securing means constituting the sole means for securing the reel assembly in its operative position on the platform casing.

2. In an agricultural implement, the combination set forth in claim 1, wherein said first releasable means comprises a vertical attachment plate fixedly secured to each side wall and being provided with a hole therein, a hole formed in each divider component in registry with the holes in the associated side wall, and a removable fast pin for projecting through said registry holes.

3. In an agricultural implement, the combination set forth in claim 2, wherein each side wall is of sheet metal construction and is formed with a downturned flange having a hole therein in registry with said holes in the side wall and divider component, and said fast pin projects through all of said holes.

4. In an agricultural implement, the combination set forth in claim 3, wherein said side wall and its associated flange are disposed on the outer side of the adjacent vertical attachment plate.

5. In an agricultural implement, the combination set forth in claim 3, wherein said second releasable means comprises an attachment bracket fixedly secured to the outsides of each side wall and projecting laterally outwardly therefrom, the divider components are provided with foot-like portions which overlap the attachment brackets, and an additional removable fast pin projects through aligned openings which are provided in the bracket and foot-like portion.

6. In an agricultural implement, the combination set forth in claim 5, wherein each attachment bracket has a rectangular tubular construction, and is provided with a pair of forwardly extending spaced apart flanges, the foot portions on the adjacent divider component serves to support a transversely extending tubular sleeve-like attachment member which spans the distance between said flanges, and the associated additional fast pin projects through both of said flanges and the tubular attachment member.

7. In an agricultural implement, the combination set forth in claim 6, wherein a flat narrow fastening strip projects laterally from the outer end of said additional fast pin, lies alongside the outer sides of said attachment bracket, and a locking pin projects through aligned openings in said fastening strip and outerside of the attachment bracket and is secured in place by a fastening member which is disposed within the confines of the attachment bracket.

8. In an agricultural implement, the combination set forth in claim 7, wherein said fastening member for the locking pin is in the form of a cotter pin which projects through the inner end region of the locking pin.

\* \* \* \* \*